US008688033B2

United States Patent
Seeor et al.

(10) Patent No.: US 8,688,033 B2
(45) Date of Patent: Apr. 1, 2014

(54) ANTENNA SYSTEM, IN PARTICULAR MOBILE COMMUNICATION ANTENNA SYSTEM, AND ASSOCIATED TRANSMISSION AND CONTROL DEVICE

(75) Inventors: Alexander Seeor, Kolbermoor (DE); Markus Mohr, Rosenheim (DE); Roland Gabriel, Griesstatt (DE)

(73) Assignee: Kathrein-Werke KG, Rosenheim (DE)

(*) Notice: Subject to any disclaimer, the term of this patent is extended or adjusted under 35 U.S.C. 154(b) by 688 days.

(21) Appl. No.: 12/610,063

(22) Filed: Oct. 30, 2009

(65) Prior Publication Data

US 2010/0113097 A1 May 6, 2010

Related U.S. Application Data

(60) Provisional application No. 61/110,126, filed on Oct. 31, 2008.

(30) Foreign Application Priority Data

Oct. 30, 2008 (DE) .......................... 10 2008 053 850
Mar. 26, 2009 (DE) .......................... 10 2009 015 050

(51) Int. Cl.
*H04B 7/185* (2006.01)
*H04B 15/00* (2006.01)
*H04M 1/00* (2006.01)
*H04B 7/204* (2006.01)
*H01Q 1/28* (2006.01)
*H04B 1/48* (2006.01)

(52) U.S. Cl.
CPC ............. *H04B 7/2041* (2013.01); *H01Q 1/288* (2013.01); *H04B 1/48* (2013.01)
USPC .... 455/13.3; 455/523; 455/550.1; 455/562.1; 330/297; 725/106

(58) Field of Classification Search
USPC ........... 455/562.1, 523, 550.1, 13.3; 725/106; 330/297
See application file for complete search history.

(56) References Cited

U.S. PATENT DOCUMENTS 5,332,977 A * 7/1994 Fritsche et al. ............... 330/297
6,292,651 B1 * 9/2001 Dapper et al. ................ 725/106

(Continued)

FOREIGN PATENT DOCUMENTS

CN 1901727 A 1/2007
DE 19937821 A1 2/2001

(Continued)

OTHER PUBLICATIONS

Examination Report in German Patent Application 10 2008 053 851.5 (Jul. 7, 2011).

(Continued)

*Primary Examiner* — William D Cumming
(74) *Attorney, Agent, or Firm* — Nixon & Vanderhye P.C.

(57) ABSTRACT

An antenna transmission control device has a base-station-side and an antenna-side multiplexer circuit. There is an alternating protocol transfer between these two multiplexer circuits to control components close to the antenna. The current-alarmed or protocol-alarmed signals present at the antenna-side terminals of the multiplexer provided on the antenna side can be measured or detected by the multiplexer circuits and supplied to the transmission link together with a terminal-dependent or load-dependent protocol.

18 Claims, 9 Drawing Sheets

(56) References Cited

U.S. PATENT DOCUMENTS

| | | |
|---|---|---|
| 6,618,599 B1 | 9/2003 | Son et al. |
| 7,346,365 B1 * | 3/2008 | Hovers et al. .............. 455/550.1 |
| 7,466,990 B2 * | 12/2008 | Mellor et al. .................. 455/523 |
| 2002/0132644 A1 | 9/2002 | Mellor et al. |
| 2003/0119541 A1 | 6/2003 | Ubuki et al. |
| 2004/0152437 A1 | 8/2004 | Behzad |
| 2004/0152492 A1* | 8/2004 | Gray .......................... 455/562.1 |
| 2007/0161348 A1* | 7/2007 | Gribben et al. .............. 455/13.3 |
| 2007/0202920 A1 | 8/2007 | Eddy |
| 2010/0113097 A1* | 5/2010 | Seeor et al. ................ 455/562.1 |

FOREIGN PATENT DOCUMENTS

| | | |
|---|---|---|
| EP | 0844485 A2 | 5/1998 |
| EP | 1085773 A1 | 3/2001 |
| EP | 1455413 B1 | 6/2006 |
| EP | 1356539 B1 | 8/2006 |
| WO | WO02076115 A2 | 9/2002 |
| WO | WO2008033076 A1 | 3/2008 |

OTHER PUBLICATIONS

Antenna Interface Standards Group Standard No. AISG1: Issue 1.1 (Jul. 30, 2004).

International Search Report issued in related PCT application PCT/EP2009/007573 (Feb. 10, 2010).

Jung, P., Analyse und Entworf digitaler Mobilfunksysteme, Verlag Teubner, Stuttgart, pp. 231-240 (1997).

\* cited by examiner

ANTENNA SYSTEM, IN PARTICULAR MOBILE COMMUNICATION ANTENNA SYSTEM, AND ASSOCIATED TRANSMISSION AND CONTROL DEVICE

CROSS-REFERENCES TO RELATED APPLICATIONS

This application claims the benefit of priority from provisional application No. 61/110,126 filed Oct. 23, 2008, the contents of which is incorporated herein by reference.

FIELD

The invention relates to an antenna system, in particular a mobile communication antenna system, and an associated transmission and control device.

BACKGROUND AND SUMMARY

Mobile communication antennae can radiate and/or receive in one or more frequency bands, for example in a 900 MHz band, a 1800 MHz band, a 1900 MHz band, or for example in a UMTS band, thus for example in a range from about 1920 MHz to 2170 MHz. In principle there are no restrictions to other frequency ranges.

Proven mobile communication antennae work with radiators or radiator devices which, for example, can transmit and/or receive in two polarisations which are perpendicular to each other. In this respect, X polarisation is also often mentioned, since the two polarisation planes are in principle aligned at a +45° angle and a −45° angle respectively to the horizontal plane or vertical plane. Irrespective of this, the main radiation direction of mobile communication antennae is often set at a radiation angle which differs from a horizontal alignment, and which preferably can be changed by remote control. This involves remotely controllable electronic downtilt angle adjustment, and an associated adjustment device, often also called an RET unit for short.

Such a controller is to be taken as known, for example, from EP 1 356 539 B1, and an associated method of operating such an RET unit from, for example, EP 1 455 413 B1.

Irrespective of the construction of the antenna systems in the region of a base station, it is necessary that the corresponding antenna systems should be synchronised with each other.

According to most mobile communication standards, the synchronisation of the base station is also ensured via a network and switching system, called "NSS" for short, and also known as the backbone network.

Satellite signals are not required here, since the subscribers are synchronised in the appropriate connection channel. The basic properties of such a mobile communication system are reproduced in, for example, P. Jung: Analyse and Entwurf digitaler Mobilfunksysteme, Verlag Teubner, Stuttgart, 1997, pp. 231-240.

Against this background, the mobile communication network is constantly expanded by providing new mobile communication systems, if appropriate at the same location, in particular at the same mast. This leads to a base station being doubled, tripled etc., i.e. for example to doubling of the number of antennae controlled via the base station and to doubling of the number of HF feed lines extending between the base station and the antenna, and of the associated electronic components, for controlling a system, for example in the form of current-alarmed devices (also sometimes called "CWA devices" for short in the following, the abbreviation "CWA" standing for "current window alarm"). Newer antenna systems are also equipped, for example, with so-called AISG device functions (where AISG stands for "antenna interface standards group"). Antenna systems are also equipped, for example, with 3GPP device functions, which allow communication not via the AISG protocol, but via the 3GPP protocol (where "3GPP" stands for "3rd generation partnership project").

To achieve a degree of simplification in this case, it is also known, when expanding a mobile communication system by adding a second antenna system and a second base station, to use the feed line between the base station and the antennae jointly as far as possible (feeder sharing). Separate DC supply and current alarm lines to the HF feed lines may still be necessary.

One of the above-mentioned expansions may result in complex or hybrid antenna constructions, as is shown for the prior art in FIG. 1, for example.

In the antenna system according to FIG. 1, known from prior art, three antenna devices, specifically a first antenna device ANT1, a second antenna device ANT2 and a third antenna device ANT3, are mounted for example at a mounting location 1, for example in the form of a mast 1' (or on a housing or building, etc.) and are provided as mentioned at the outset with suitable radiators, for example X-polarised radiators, to transmit and/or receive in two polarisations.

Three base stations BS1 to BS3 are associated with each of the three antenna devices ANT1 to ANT3.

The base station BS3 may for example be a conventional base station which controls and powers the third antenna device ANT3. In this embodiment, the antenna device is not operated in a manner controlled by a protocol, but using "current alarming", i.e. using CWA logic and/or CWA devices, which take up different currents depending on fault changes and/or status changes, allowing appropriate control of the components. For this purpose, the third base station BS3 is equipped with the CWA logic and/or CWA control devices, for example via two HF/DC feed lines 5.3a and 5.3b, which are connected to an antenna-side CWA device unit 17.3, which is connected upstream from the associated antenna device ANT3, so that via the HF/DC connecting lines 5.3a and 5.3b, the radiators belonging to the antenna device ANT3 can be controlled correspondingly to operate the antenna system.

The example according to FIG. 1, known from the prior art, may for example be the result of the above-mentioned base station BS3 with the associated antenna arrangement ANT3 and the current-alarmed antenna components 17.3 being expanded with a further antenna system, likewise known from the prior art, with an antenna device ANT1 and an associated base station BS1 as well as an associated mobile communication component 17.1, this added antenna system being equipped for example with ALSG device functions, i.e. it is possible to implement communication between the base station BS1 and the antenna-side mobile communication component 17.1 via the AISG protocol.

In accordance with the example known from the prior art and shown in FIG. 1, a third base station BS2 has additionally been fitted and is for example equipped with 3GPP device functions, which allow communication via the 3GPP protocol. A corresponding interface unit is provided on the base station BS2. Further, the 3GPP control or mobile communication component 17.2 is provided close to the antenna of the associated antenna device ANT2 (i.e. generally at the top of the mast).

To reduce the total number of feed lines 5 required, these may in part be used jointly. In the same embodiment, two further base feed lines 5.1 and 5.2 are provided in addition to the two feed lines 5.3*a* and 5.3*b* for the operation of the antenna system ANT3 and are used jointly by the antenna systems ANT1 and ANT2. For this purpose, two diplexers 11 are associated with the two base stations BS1 and BS2, the two output or base feed lines 5.1*a* and 5.1*b* or 5.2*a* and 5.2*b* respectively also being guided via the two diplexers 11L for the first base station BS1 and the second base station BS2, in such a way that the number of additional feed lines required in this case can be reduced from four to two. Similarly, two diplexers 11H, generally provided on the top of the mast 1' close to the antenna, must in turn split the two antenna systems ANT1 and ANT2 in order for the HF signals for sending or receiving to be assigned correctly to the individual antenna systems.

Further, FIG. 1 also shows that for example a DC supply and the AISG or 3GPP protocol are provided in each case via one of the base feed lines 5.1*a* and 5.2*a*, by the first and second base stations BS1 and BS2 to the respective feed line 5.1 or 5.2 via the respectively associated base-station-side diplexer 11L, and supplied to the mobile communication components 17.1 and 17.2 respectively via the antenna-side diplexer 11H and the subsequent antenna feed lines 5.1'*a* and 5.2'*a*. This DC transmission and the transmission of the AISG or 3GPP protocol is shown in dotted lines in FIG. 1, the HF feed line between the base and the antenna basically being shown in thick lines.

FIG. 1 also shows that the two feed lines 5.3*a* and 5.3*b* also supply direct current in particular to the current-alarmed devices. This DC transmission is shown in dashed lines in FIG. 1.

The use of the common feed lines 5 may also be further improved and optimised, as is shown for example in FIG. 2 for a further joint antenna system. In this case, two triplexers 111L are now provided on the base station side and are each connected to three terminals on the base station side, a terminal of the two triplexers 111L being connected in each case to a respective terminal of the associated base station BS1, BS2 or BS3. In other words, a first terminal of each of the three base stations BS1 to BS3 is connected to a triplexer 111L and a second terminal of each of the three base stations BS1 to BS3 is connected to an input of the second triplexer 111L. The two triplexers each have a terminal on the antenna side, each of said terminals being connected to one of the two feed lines 5*a* or 5*b*.

On the antenna side, the construction is reproduced approximately symmetrically, the HF signals supplied via the two individual feed lines 5*a*, 5*b* now, via two further triplexers 111H, being split correspondingly via the three respective terminals of the two triplexers 111H and being supplied to the three antenna systems ANT1 to ANT3. The three outputs of the first triplexer 111H are thus connected to three inputs of the mobile communication components 17.1, 17.2 and 17.3, the three outputs of the second triplexer 111H being connected to the respective second terminals on the mobile communication components 17.1, 17.2 and 17.3. This means that the two corresponding HF signals are present in each case at the mobile communication components 17.1 to 17.3 and can be transmitted to the first antenna ANT1 via the connection lines 5.1"*a*, 5.1"*b*, to the second antenna ANT2 via the connection lines 5.2"*a* and 5.2"*b*, and to the third antenna device ANT3 via the two connection lines 5.3"*a* and 5.3"*b*.

In this way, the three antenna systems ANT1 to ANT3 are controlled by means of the AISG and/or 3GPP protocol or via CWA current alarming (without the use of a protocol).

In relation to the antenna system ANT3, so-called bias tee devices BT (i.e. devices for HF-transparent DC coupling and decoupling) are also provided on the base station side and the antenna side in each case, so as to supply the CWA components with direct current on the one hand and, on the other hand, to allow the CWA devices or control components 17.3 provided on the antenna side to take up different currents depending on fault changes and status changes, which can then correspondingly be evaluated at the base station.

In other words, in the antenna systems ANT1 to ANT3, mobile communication components 17, mounted for example on the mast 1', on a wall 1 of a building etc., are provided, such as TMA amplifiers (so-called low-noise "tower mounted amplifier" reception amplifiers) and/or RET units for remotely adjusting the lowering angle, i.e. the radiation angle of the antennae, also known for short as the downtilt angle, etc.

Thus, by contrast with FIGS. 1 and 2, it is conceivable to reduce the number of feed lines required in the prior art, possibly for reasons of cost.

In known systems of the type described in relation to FIGS. 1 and 2, the problem would then arise that it is not clear which base station BS1 to BS3 actually supplies a corresponding ALD mobile communication component with direct current (DC voltage). In general, one base station may not provide and/or cover the entire DC supply for all the ALD mobile communication components which are for example associated with another base station.

If different DC supply voltages were provided by a plurality of base stations connected in parallel, then this would also present a problem if the ALD mobile communication components were supposed thus to be supplied by a common HF feed line.

Finally, if there is a further reduction in the feed lines, then older so-called current-alarmed CWA components may also present a further problem in the complexes, i.e. combined mobile communication systems, explained by way of FIG. 1 and FIG. 2 This is because the use of such current-alarmed (CWA) ALD devices or mobile communication components takes up different currents depending on fault changes and/or status changes, and the corresponding base station monitors and must evaluate these currents in order to pass status and fault changes onwards to master systems as a function thereof. The DC interconnection of various ALD mobile communication components via a common feeder, i.e. common feed lines, means that the currents of individual ALD mobile communication components can no longer be divided on the base station side. Thus, correct alarming and/or display of any status changes is no longer provided in an antenna system with CWA systems.

However, in the aforementioned combination of older current-alarmed (CWA) systems and newer systems in which the alarming and/or control takes place for example via the AISG or 3GPP protocol, yet further problems may arise (if these systems are fed via a common feeder construction). This leads under some circumstances to incompatibilities with a common feed line, specifically if different protocols, used independently of one another (different primaries) are used. In other words, data collisions may occur on the data bus and do not allow correct operation of the antenna system as a whole in the context of a mixed antenna construction of the type described. In particular, it is possible for example that AISG or 3GPP protocol signals or any additional client-specific protocols may be short-circuited by CWA-ALD components (differently depending on the various current-alarmed ALD components), and this can lead to correct data communication breaking down completely.

The object of this invention is therefore to create an improved complex antenna system, along with the central transmission and control devices required therefor, which allows the operation of a plurality of individual antenna systems with associated base stations (i.e. for transmitting different frequency bands) in a "mixed" environment, using different components.

The solution according to the invention is based on a multiplexer (MUX), i.e. a multiplex circuit, which will also sometimes be referred to as MUX for short in the following, being used in each case, on the base station side and moreover on the antenna side.

This is a so-called "intelligent" multiplexer circuit, which may be constructed in the form of a diplexer or triplexer or thus generally in the form of a multiplexer, depending on how many base stations and associated antenna devices are to be used jointly exploiting a common feeder construction (common feed line construction).

The multiplex construction on the base station side thus scans, on the terminal side associated with the base stations, for whether the relevant base station for example transmits one or more AISG protocols, one or more 3GPP protocols and/or possibly only one or more direct current signals (DC signals) without a corresponding protocol, in the last of which cases this would then be current-alarmed (CWA) device control or optionally device control which is provided merely by communication by the antenna-side mobile communication components from these to the base station (it also being possible alternatively or additionally to have device control in which the communication between the antenna-side mobile communication components and the base station is for example initiated and carried out by the base station). The corresponding scanning result is then transmitted to the antenna devices, i.e. to the multiplex circuits on the antenna side connected upstream from the antenna devices, via the common feeder construction using a suitable protocol. This results in turn in an echo (return transmission), for example to an AISG protocol or a 3GPP protocol or the provision of a pure DC signal, as if the relevant base station had transmitted an AISG protocol and a 3GPP protocol or any other protocol (for example a proprietary protocol) on separate paths or if corresponding antenna control took place only via current-alarmed devices (CWA), or devices which communicate only from the antenna side to the base station side. In other words, the protocols exchanged and/or transmitted between the base-station-side and antenna-side multiplex circuit are supplied to the corresponding antenna devices or base stations with the correct assignment.

The multiplexer circuit on the antenna side checks whether loads are connected to the antenna-side outputs thereof and optionally measures the current uptake thereof and communicates this result to the base-station-side multiplex circuit. Thus, it is also possible correspondingly to provide a DC supply of any size, such as would be fed into an HF feed line when using an older base station at the relevant point, for the CWA devices in a precise manner.

This means that the respective direct current required can be adjusted precisely and a corresponding DC supply of the associated antenna units can be simulated at the base-station-side terminals of the base-station-side multiplexer circuit.

Finally, within the scope of the invention, different DC voltage sources can be interconnected at the base stations, in which case a galvanic separation between the base-station side terminals of the multiplexer is produced by the antenna-side terminals of the multiplexer. This makes it possible for the base-station-side multiplexer to simulate, at the corresponding inputs provided for the connection to the base station, power uptakes which correspond to the states (for example the corresponding power uptake in an operation or fault state) at the ALD components associated with the respective base station (with a fixed setting or fully configurable).

In a preferred embodiment of the invention, a further separate interface, which can be used either to control the multiplexer and/or an antenna device which can be reached via it and/or to provide direct current, is provided on the relevant multiplexer.

This mentioned additional interface on the multiplexer can also be omitted in the case of sufficient total DC power at the base-station-side terminals.

BRIEF DESCRIPTION OF THE DRAWINGS

Further advantages, details and features of the invention result from the embodiments shown in the accompanying drawings. In detail.

DETAILED DESCRIPTION

Below, reference is made to FIG. 3.

Figure 1:
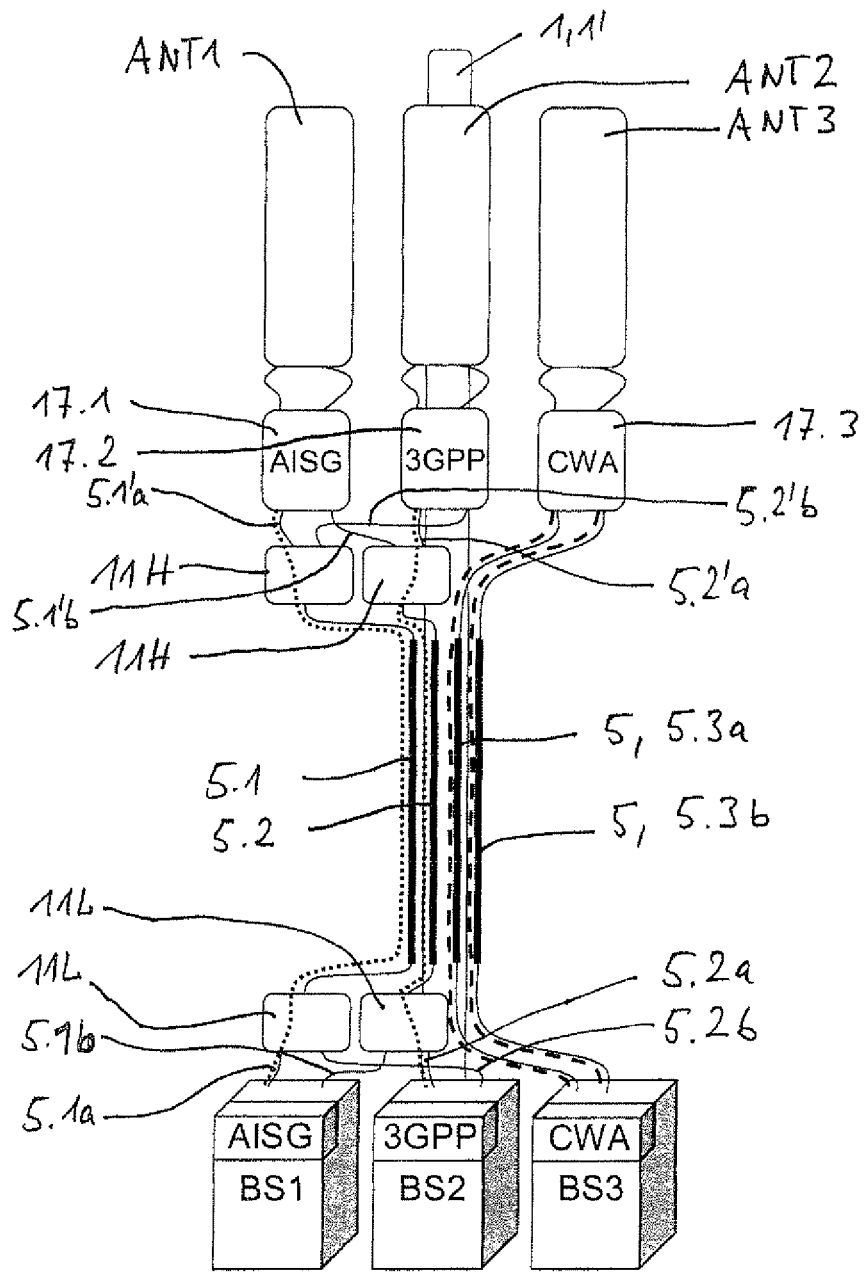
FIG. 1 is a first schematic representation of a first embodiment of a mobile communication system with three base stations and three associated antenna devices according to the prior art.
Figure 2:
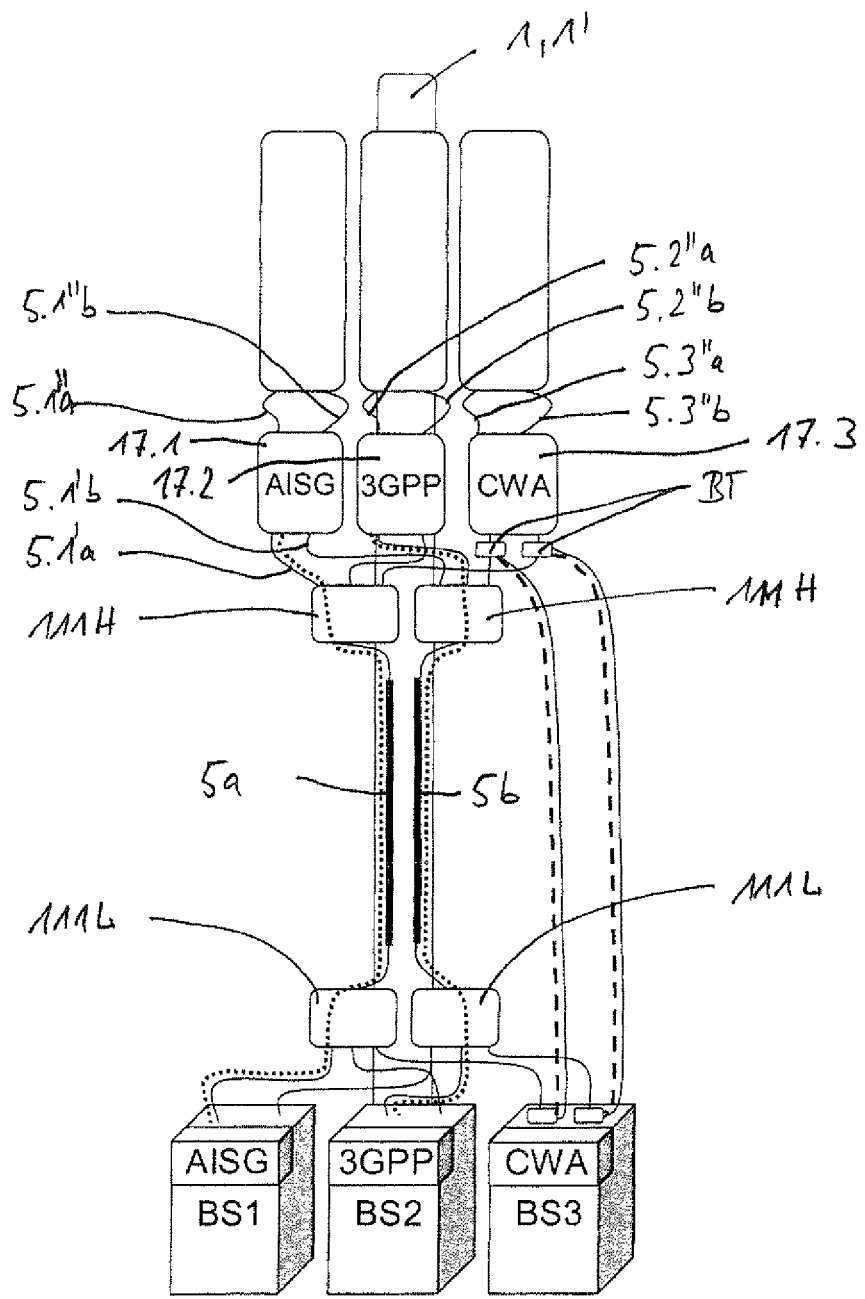
FIG. 2 shows a modified embodiment of FIG. 1, such as is also known from the prior art.
Figure 3:
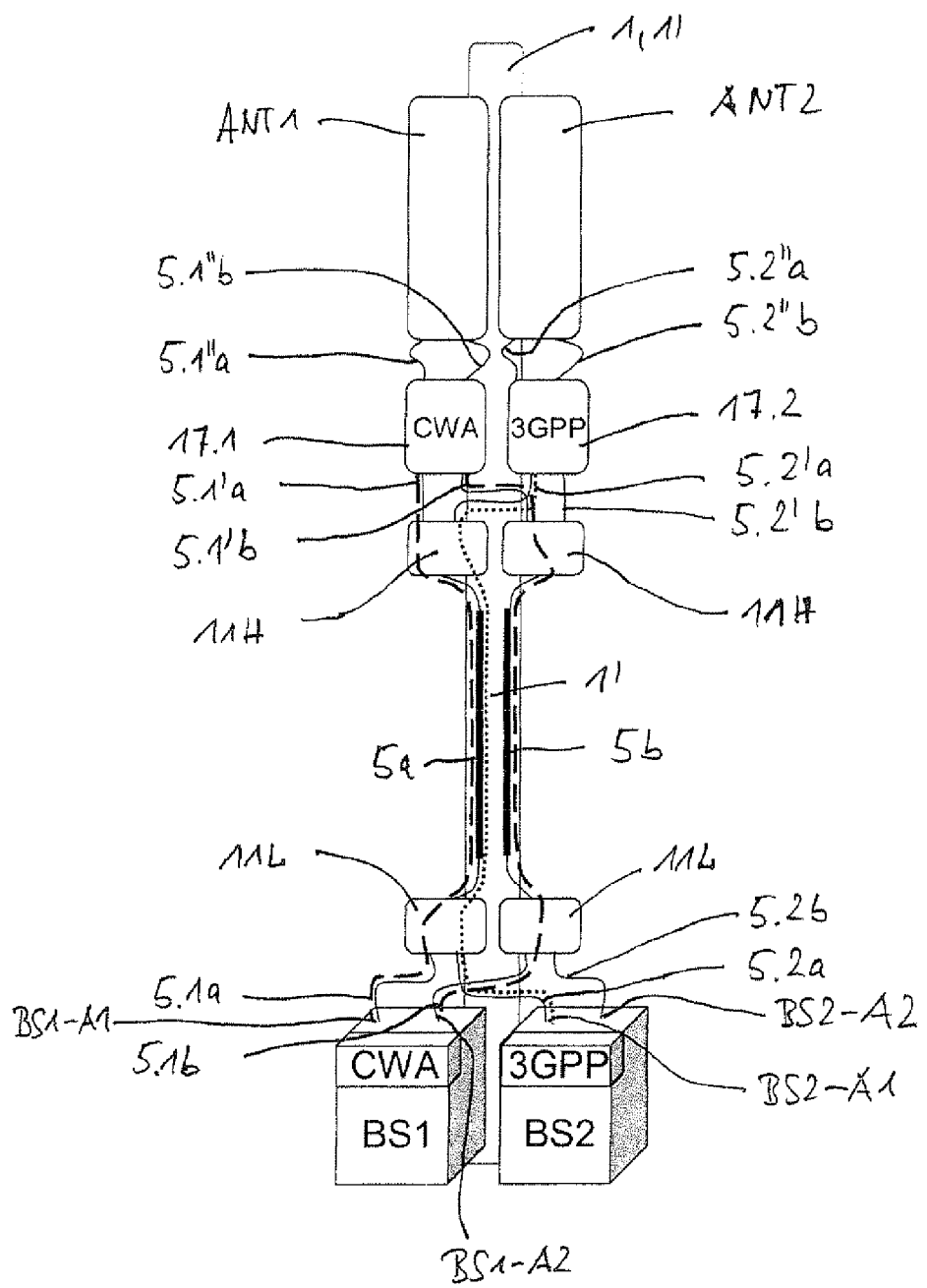
FIG. 3 shows a first embodiment according to the invention of an antenna system according to the invention, using two differently functioning base stations.

FIG. 3 shows a first embodiment according to the invention of two antenna systems with a first antenna device ANT1 and a second antenna device ANT2, of which FIG. 3 basically shows only the radome, below which the radiator devices, which for example generally radiate in one, two or more frequency bands, are provided. Preferably, the transmission and/or reception operation takes place in two mutually perpendicular polarisation planes. In this respect, reference is made to known solutions. It is basically assumed in the following that a so-called base station in each case transmits or receives HF signals in a frequency band. In the embodiment of FIG. 3, the two antennae radiate in two frequency bands, one frequency band being assigned respectively to each base station. Even if a base station were intended to send and/or receive in a plurality of frequency bands, for example, the following description of the control (the protocol-dependent control) would apply to each frequency band respectively, even if for example the transmitter and receiver units for two different frequency bands were combined in a so-called single base station.

As in the prior art, two base stations BS1 and BS2 are associated with the two antenna systems ANT1 and ANT2, the base system BS1 being part of an older antenna system for example, in which the base station is controlled by current-alarmed mobile communication components.

On a mast 1', in principle only two feed lines 5a and 5b are available, and these are shared between the two antenna systems.

The antenna system ANT1 is also controlled and/or operated on the antenna side via current-alarmed (CWA) ALD mobile communication components 17.1, which are connected to the associated antenna ANT1 via two HF connecting lines 5.1"a and 5.1"b.

In this embodiment too, two base diplexers 11L are provided and for one polarisation the output BS1-A1 is connected via a base-station-side connecting line 5.1a to a first input of a diplexer 11L, and the antenna-side terminal of the diplexer 11L is connected via the HF feed line 5a to one of the two antenna-side diplexers 11H, of which one antenna-side terminal is connected to the current-alarmed ALD mobile communication component 17.1 via a connecting line 5.1'a.

For the second polarisation, a further base-side connecting line 5.1b of the output BS1-A2 is connected to a first input of the second diplexer 11L, of which the antenna-side terminal is connected via the second HF feed line 5b to the antenna-side second diplexer 11H, of which one output is in turn connected to the second input of the current-alarmed ALD mobile communication component 17.1 via a corresponding connecting line 5.1'b.

The drawing shows (in dashed lines) that not only the HF signals, but also the associated DC supply for current alarming take place via the two shown HF feed links 5a, 5b from the base station BS1 to the first antenna device ANT1.

Accordingly, the two outputs BS2-A1 and BS2-A2 of the second base station BS2 are connected to the corresponding second inputs of the two base-station-side diplexers 11L.

For operation, it is now provided that the upper multiplexer device, in the present case in the form of a diplexer 11H, measures the power consumption at its antenna-side interfaces, and transmits a corresponding information signal to the base-station-side diplexer, for example in the form of an HDLC protocol, for example at a transmission rate of 115.2 kbps.

This information may relate to the measured current or a failure state, for example with reference to a low-noise reception amplifier, or with reference to two low-noise reception amplifiers TMA which are provided in one housing and are as provided for the antenna device ANT1.

The base-station-side diplexer circuit 11L can extract this information from the current and data line and correspondingly set the required current as a function of this information. This minimises the load of the external current and voltage supply on the base station side.

The multiplexer circuit, in the present case the diplexer circuit, allows the respectively required modulation, demodulation, power transformation and regulation of the current consumption.

Depending on the construction of the multiplex or diplex circuit, it is also possible to ensure that the corresponding power supply is separated from the current and power supply of the base station. In other words, the power supply for the diplex unit can be provided separately externally to the base station.

The second antenna device ANT2 with the second base station BS2 controls the associated antenna device ANT2, for example via a 3GPP protocol, the two connecting lines to the base station also being connected to the two antenna-side diplexers 11H, specifically to the respective second terminals of the upper diplexer 11H, via the two diplexers 11L and the two HF feed cables 5a and 5b connected downstream. In these two diplexers 11H, the HF signals are then split, for which purpose the second terminals, each provided on the antenna side, on the diplexers 11H are connected to the two inputs of an associated 3GPP mobile communication component 17.2 via connection lines 5.2'a and 5.2'b. The 3GPP mobile communication components 17 or 17.2 are then connected via two further terminals to the associated antenna devices ANT2 via the connecting line 5.2"a and 5.2"b.

FIG. 3 also shows that a DC supply or the 3GPP protocol is transmitted from a terminal of the second base station BS2, at least via an HF link 5a. This is shown in dotted lines in FIG. 3, only one of the two transmission links (HF links) acting as a DC supply line and as a transmission line for the 3GPP protocol.

If a corresponding antenna system is to be put into operation, the following starting scenario is possible:

1. The DC and pilot bypasses on the antenna-side diplexer unit 11 are open.
2. The base-station-side multiplexer or diplexer unit 11 makes available a required proportion of the power supply (which may be provided by an external power supply) for the antenna-side components, and feeds this power, for example at 12 V DC, into the HF feed line.
3. All the base-station-side interfaces of the base diplexer 11L transmit the pilot signal (possibly by multiplexing or statically). The pilot signal is generally the carrier signal which is modulated appropriately for the transmission of the protocols or protocol signals.
4. The diplexer 11H on the antenna ANT1 side is supplied via the HF feed line and interrogates its terminals and interfaces for whether ALD components 17 are connected (for example whether or not a DC short circuit is present).
5. To supply the connected ALD components 17 with appropriate power (direct current), a diplexer 11H on the antenna ANT side will activate the power, depending on the interrogated (scanned) ALD state, and make it available.

6. The diplexer 11H on the antenna side measures the power supply of a connected ALD component 17, permanently, and transmits this information to the dipiexer 11L on the base station side, for example on the basis of the AISG protocol or on the basis of the 3 ms time slot method or any other protocol or method, for example by frequency division multiplexing or with a proprietary protocol or method.
7. The diplexer 11L on the base station side sets the desired power requirement accordingly.
8. The diplexer device 11L on the base station side permanently scans, i.e. permanently interrogates, for example by multiplexing (for example 0×7E or other bytes/bits), the interfaces thereof.
9. The corresponding scan result (interrogation result) is transmitted to the dipiexer 11H on the antenna side, which opens its pilot bypasses according to this information. However, the antenna-side diplexer 11H also opens its own pilot bypasses when it detects a corresponding pilot signal at a corresponding antenna-side interface. This is possible, for example, if instead of a CWA component a device which communicates only from the antenna side to the base station side is involved. This interrogation result is also transmitted to the base-station-side diplexer 11L, which then in turn opens its correctly associated pilot bypasses in accordance with this information.
10. The data rate between the base-station-side and antenna-side diplexers 11L and 11H is for example set to 115.2 kbps.

The above-mentioned transmission of, for example, the plurality of AISG protocols and/or the plurality of 3GPP protocols between the base-station-side and antenna-side multiplexer circuit is a data transfer, for example by high-level data link control. This is a standardised network protocol, which allows point-to-point connections or even point-to-multiple-point connections.

Because the transmission takes place for example via HDLC frames at a higher speed than the transmission of the AISG or for example the 3GPP protocol, it is possible for the various AISG or 3GPP protocols to be transmitted between the two multiplexer circuits in one of more HDLC frames with time-sharing on the HF feed link. For example, the various protocols may also be transmitted simultaneously, for example by frequency division multiplexing. In the antenna-side multiplexer circuit, the protocols combined or transmitted in the HF feed link are supplied to the correct antenna via the respectively associated terminals of the relevant antenna device controlled by the respective protocol or of the antenna components connected upstream from the antenna device.

In principle, however, it would also be possible, for example in the base-station-side multiplexer circuit to translate or convert the protocols received there into a different protocol and to transmit them via the HF link to the antenna-side multiplexer circuit, for example in a time-shared manner or simultaneously or by another modulation method, and there to convert them back into the respective original protocols, for example into an AISG or 3GPP protocol.

Purely for completeness' sake, it is noted for example that out of five connected base stations, one to for example two, three, four or all of the base stations may work with the AISG protocol and be able to control the associated antenna devices thereof, or that for example one, two, three, four or all of the base stations only work with the 3GPP protocol. In any case, the individual protocol portions must be processed in such a way that in each case the control signals associated with an HF frequency band or a base station (it being assumed in a simplified manner that one base station is provided for each HF frequency band, even if in the conventional sense a plurality of sub-base-stations, each available for transmission in one frequency band, could be combined in one base station) are exchanged with the correct associations, between the correct associated base stations and the antenna devices ANT controlled by them as well as the associated antenna components 17 connected upstream.

Below, reference is made to FIG. 4a, which shows an expanded embodiment in which a third antenna unit BS3 is now also connected and works with an AISG protocol.

In this variant, triplexers 111 are used instead of diplexers both on the base station side and on the antenna side, each output on all three of the base stations being connected via a separate line 5.1a, 5.2a or 5.3a to a separate input of the first base-side triplexer 111L, and each of the second terminals on the three base stations being connected via a respective further connecting line 5.1b, 5.2b or 5.3b to a respective separate input of the second base-side triplexer 111L. The first base-side triplexer 111L is then electrically connected to one feed line 5a and the second triplexer 111L to the second feed line 5b. On the upper side of the antenna, the HF feed cables 5a, 5b are conversely split, with the aid of the two antenna-side triplexers 111H, onto the respective mobile communication components 17, from which, with reference to the antenna device ANTS, a component 17 based on the AISG protocol comes into use.

Figure 4A:
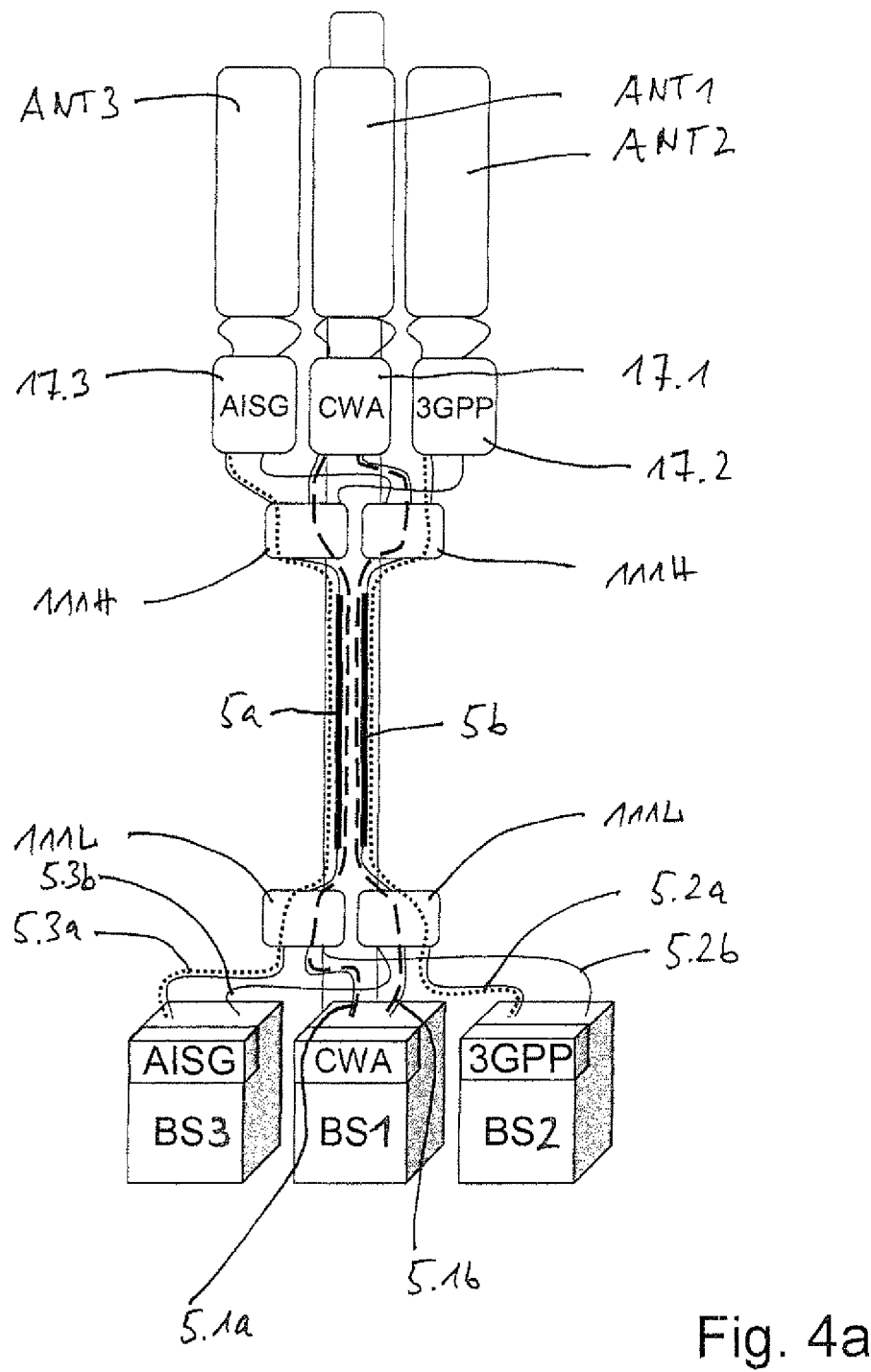
FIG. 4a shows a second embodiment according to the invention of an antenna system according to the invention, using three differently functioning base stations.

The DC supply provided via the two feeders 5a and 5b, including the communication by means of the AISG or 3GPP protocol (or another protocol, for example a proprietary protocol), is shown in dotted lines in FIG. 4a. From this it can thus be seen for example that the AISG protocol is transmitted between the base station BS3 and the antenna-side devices 17.3 via the feed line 5a whereas the 3GPP protocol for the second feed line 5b is transmitted between the base station BS2 and the associated antenna-side devices 17.2. The CWA devices 17.1 transmit the corresponding current-alarmed signals to the base station BS1 via both feed lines 5a and 5b. For this purpose, the further DC supply, via one of the two feeders 5a, 5b in each case, for implementing current alarming is shown in dashed lines.

The multiplex circuit, in this case in the form of a triplexer, continuously interrogates all inputs for whether an AISG protocol or a 3GPP protocol (or another protocol) is present there, and/or whether only a DC signal or DC level, required for the current-alarmed CWA devices, is detected.

Figure 4B:
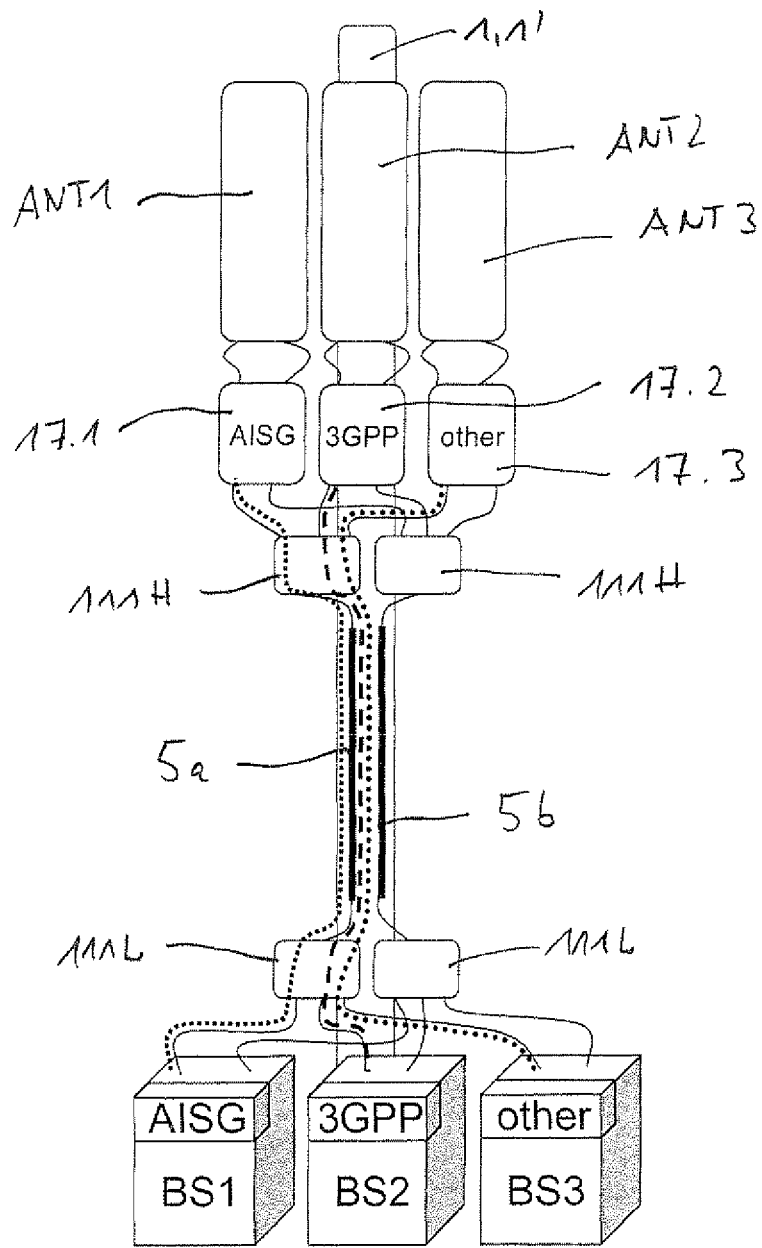
FIG. 4b shows a third embodiment according to the invention of an antenna system, using three differently functioning base stations.

By contrast with the embodiment of FIG. 4a, FIG. 4b merely shows that in this case for example the AISG protocols and a 3GPP protocol or alternatively another protocol (for example a proprietary protocol) can be transmitted between the base station BS1 or BS2 or BS3 and the associated antenna-side devices 17.1 to 17.3 via just one feeder link, i.e. a feed link 5a, specifically by a suitable method such as another time division multiplexing or frequency division multiplexing method or another different method, for example using one or more proprietary protocols. This takes place by way of the described base-station-side triplexers 111L or the antenna-side triplexers 111H, whereby the corresponding protocols are combined into the common feeder link or separated onto the different antenna-side devices 17.1 to 17.3 or base stations.

Figure 5A:
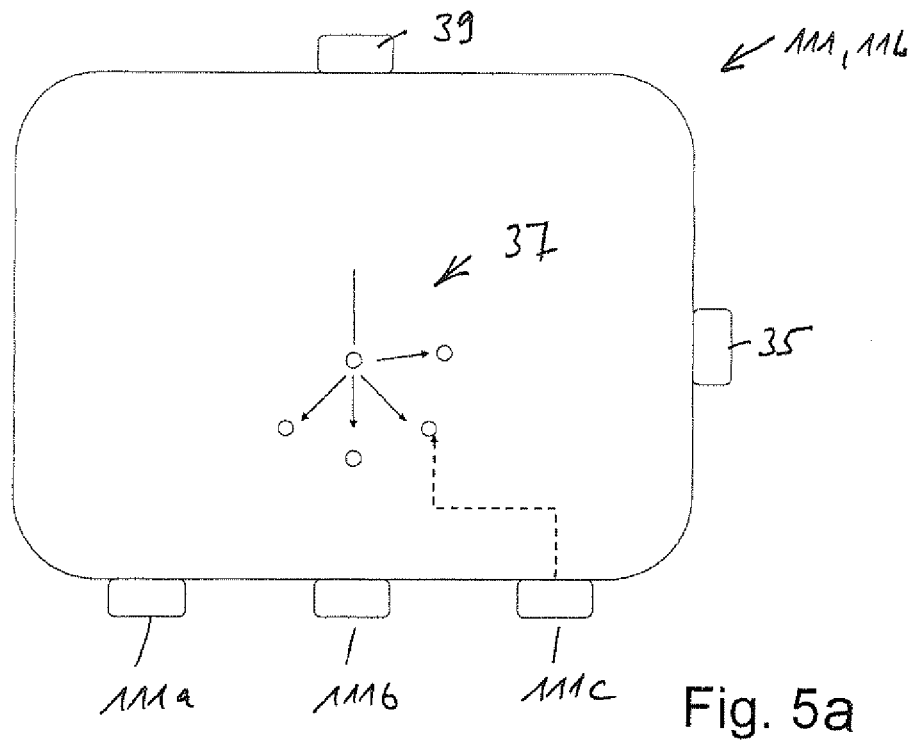
FIG. 5a is a schematic representation of a multiplexer (triplexer) according to the invention, to illustrate the integrated scanning device for interrogating the multi-terminals which lead to the various base stations.
Figure 5B:
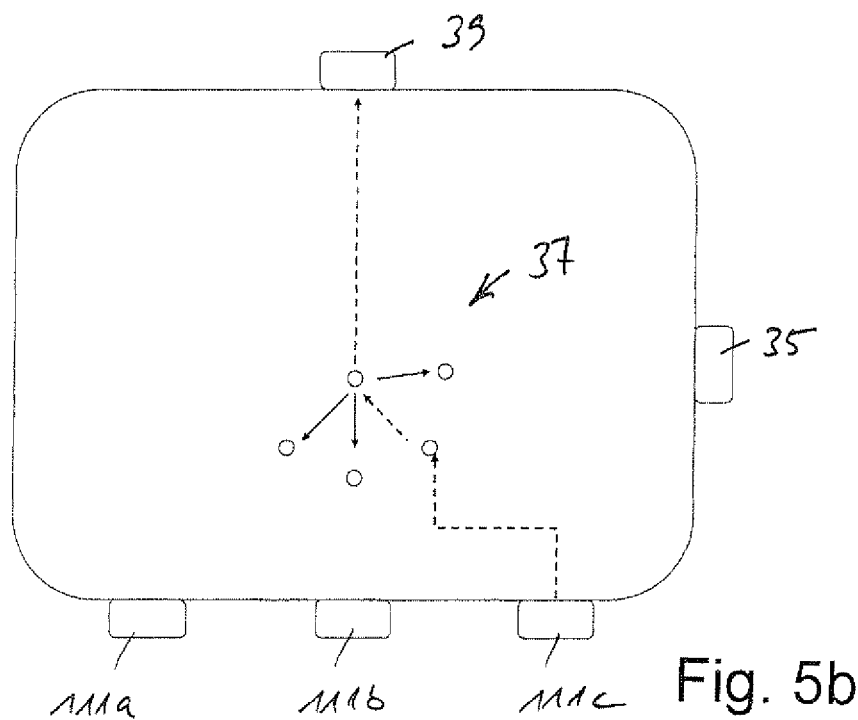
FIG. 5b is a drawing to clarify the connection of an interface (which provides a connection to one of a plurality of base stations) to the antenna-side components after it has been established at which interface an HDLC protocol signal is present.

FIG. 5a shows schematically a multiplexer 111L according to the invention (for example in the form of a triplexer 111 according to the invention) which is connected at the three inputs 111a, 111b and 111c thereof to the base stations BS1, BS2 and BS3, for example via three separate connecting lines. Internally, each of the three inputs 111a to 111c is scanned, i.e. interrogated, one after another or simultaneously in the multiplexer for whether for example an HDLC signal (HDLC frame) with corresponding data information is present. If for example as shown in FIG. 5a it is established, after interrogating all of the interface-terminals, that an AISG protocol signal coming from the third base station BS3 is present at the input 111c, then this is fed into the HF transmission line 5 at the output 39, preferably in the form of an HDLC frame. This makes it possible, in the case of continuous or temporally offset sequential or simultaneous scanning of the individual inputs 111a to 111c, for the individual protocol signals present there to be time-shared with a higher transmission speed, for example as an HDLC frame, to the triplexer on the antenna side on a common transmission link 5, as is illustrated in FIG. 5b. However, the protocol signals present could also be transmitted simultaneously on a common transmission link 5, for example by frequency division multiplexing or another modulation method or by a combination of different modulation methods, for example also including a proprietary modulation method. It is thus shown in FIG. 5b that at this point in time for example the protocol signal, for example an AISG signal, present at a third input 111c is transferred into the HDLC frame via the scanning device 37 integrated into this base-station-side triplexer 111L and supplied at a correspondingly higher transmission speed to the HF feed line 5, not shown in greater detail in FIGS. 5a and 5b, via the terminal 39.

Figure 5C:
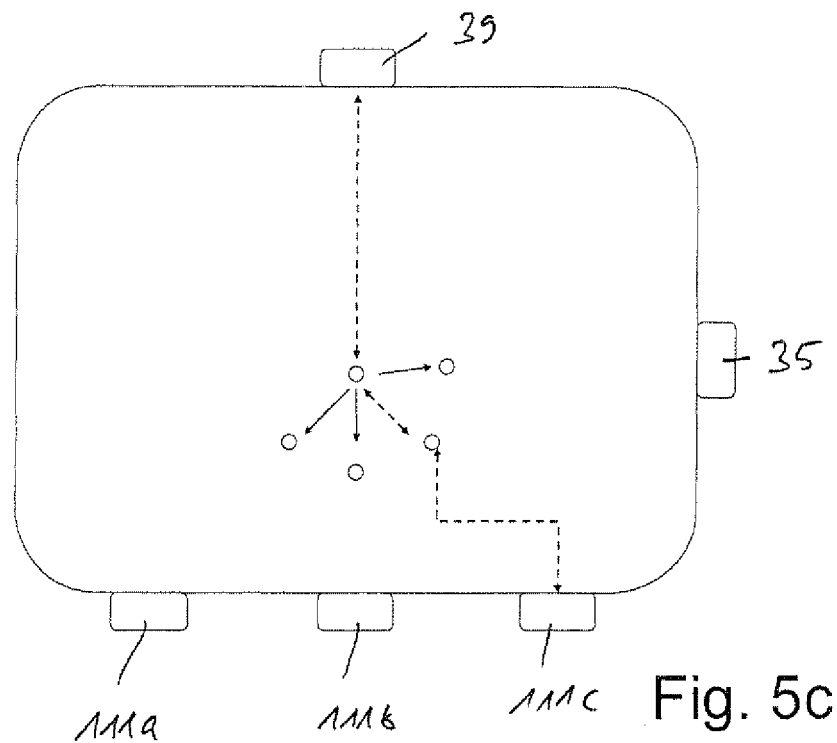
FIG. 5c is a schematic representation of the connection of an interface (which provides a connection to one of a plurality of base stations) to the antenna-side components after a connection with these has been established via an HDLC protocol signal.

FIG. 5c thus shows that after the detection of a protocol signal present for example at the third input 111c, a corresponding connection is established between this terminal or interface 111c and the terminal or interface 39 on the HF feed line side, i.e. at this point in time there is a time-shared or permanent protocol transmission to the multiplexer 111H close to the antenna ANT or to one of the multiplexers 111H and thus to the components close to the antenna and connected via said multiplexer. After the connection has been established, the transmission protocol is transmitted for example in the form of an HDLC protocol.

Figure 5D:
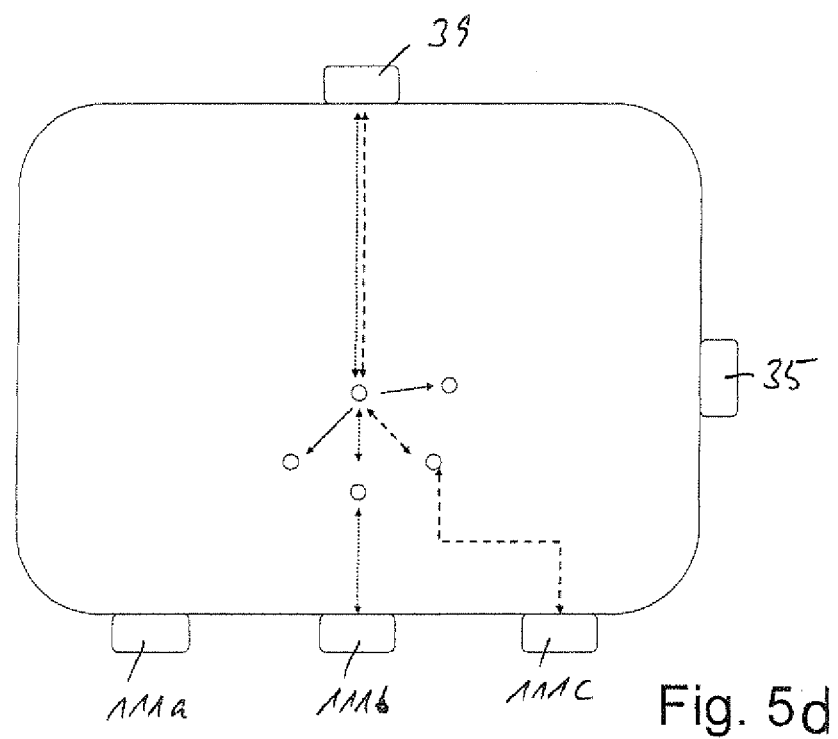
FIG. 5d is a drawing to clarify the connection of two interfaces (which provide a connection to the corresponding base stations) to the corresponding antenna-side components after a connection with these has been established via two possibly different HDLC protocol signals (for example AISG and 3GPP)

Purely for completeness' sake, FIG. 5d illustrates that for example upon the detection of two protocol signals at the inputs 111b and 111c after the connection has been established, these protocol signals are connected to the terminal 39 on the HF feed line side, i.e. to the corresponding antenna-side components, specifically via the multiplexer circuit close to the antenna. After a connection has been established, the transmission protocol may for example be implemented by means of two different HDLC protocol signals (for example in the form of an AISG or 3GPP protocol signal or a correspondingly time-shared transmission protocol). The same applies in the case where a corresponding protocol signal is also detected at the first input 111a. In this case, all three base-station-side terminals and thus the protocol signals present there would be connected via the terminal 39 on the HF feed line side and the protocol signals would thus be connected through, for example in a time-shared manner or simultaneously, specifically depending on the modulation method used or the combination of different modulation methods used.

Accordingly, from the upper multiplexer circuit 11, 111H close to the antenna, the corresponding protocol signals would be present at the terminal 39 on the HF feed line side and would then be split or divided into individual protocol signals with the correct associations, and these would be fed into the base-station-side terminals 111a, 111b and 111c with the correct associations; because when the protocols are transmitted, the corresponding information is also transmitted, specifying for which antenna device ANT1 to ANT3, and thus for which antenna-side terminal 111'a, 111'b or 111'c of the multiplexer circuit means close to the antenna ANT, a fed-in protocol signal from which base station via which associated terminal is intended. The same applies to the protocol signals transmitted to the base station from the components 17 close to the antenna. In this case, too, the protocol signals transmitted from particular components to the associated base stations are associated correctly.

The protocol identification at the multiplexer terminals on the base station side may be static or dynamic.

Figure 6A:
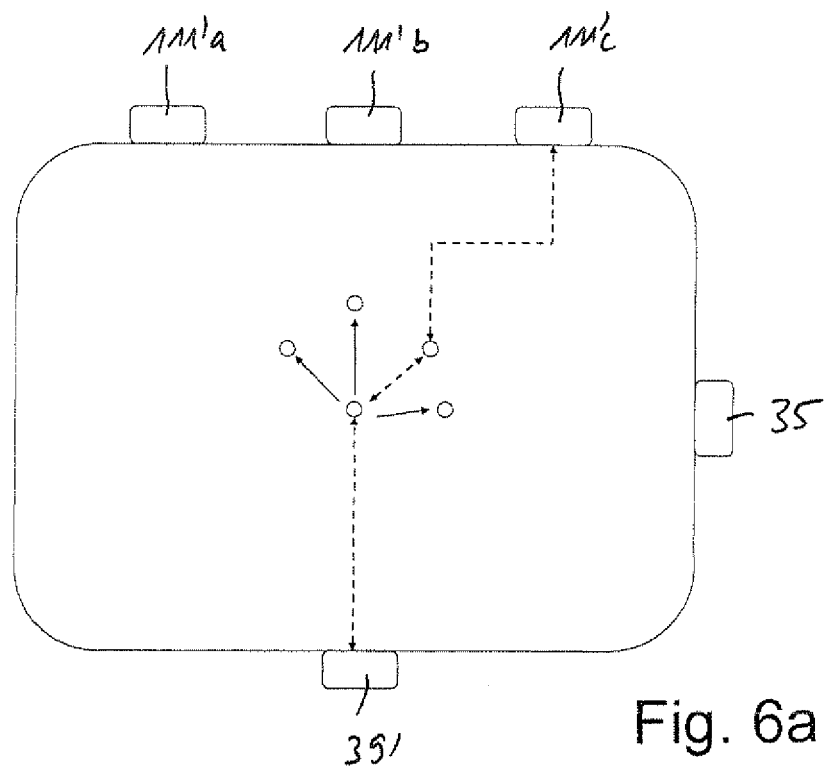
FIG. 6a is a further schematic drawing to illustrate a multiplexer (triplexer) according to the invention which is close to an antenna and which allows communication between the HF feed link and the antenna device associated with a corresponding base station, specifically after a connection has been established via an HDLC protocol signal.

The corresponding protocol signals present at the base-station-side terminals of the base-station-side multiplexer circuits 111L are then, as stated above, transmitted to the antenna-side triplexers 111H to set or configure the antenna components 17 and optionally the antenna device itself. This is shown for example in FIGS. 6a and 6b, which demonstrate that the received data and protocols at the terminal 39' coming from the feed line 5 are correspondingly converted or separated from the HDLC frame in order for example to convey DC components or a 3GPP or AISG protocol or another protocol (for example a proprietary protocol) onwards to the antenna-side mobile communication components, at the outputs 111'a, 111b and 111'c. In other words, this ultimately ensures that the respective protocols exchanged and/or transmitted between the base-station-side and the antenna-side multiplexer circuit are transmitted to the corresponding antenna components 17.1 to 17.3 of the antenna devices ANT1 to ANT5 with the correct association.

Figure 6B:
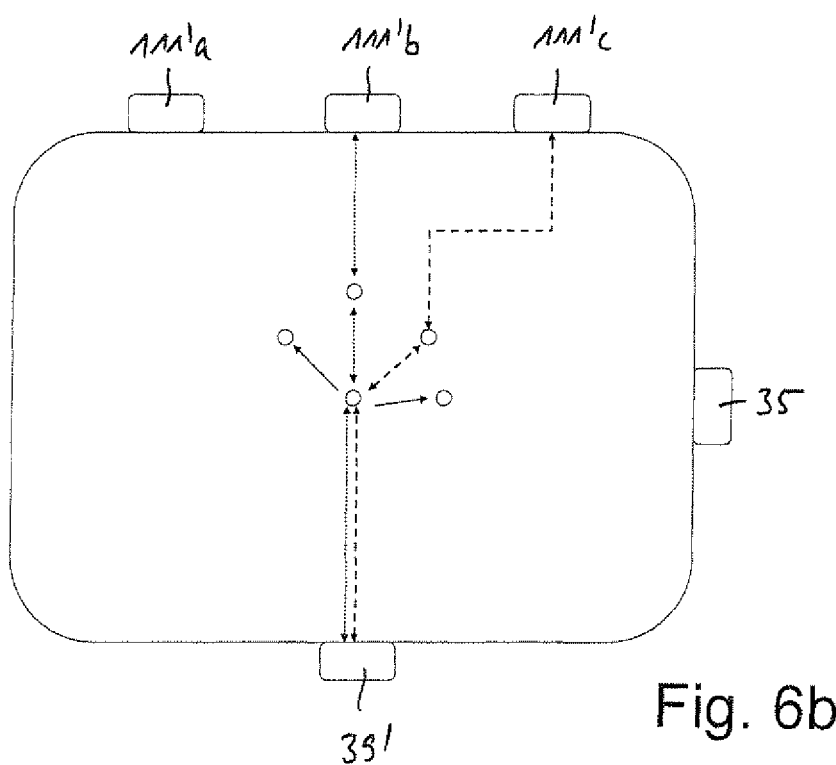
FIG. 6b is a drawing to clarify a multiplexer (triplexer) according to the invention which is close to an antenna and which allows communication with the corresponding antenna-side components via two interfaces, specifically after a connection with these has been established via two HDLC protocol signals which may each be different.

FIG. 6b thus clarifies that the ANT multiplexer 111H (triplexer) close to the antenna receives, at the terminal 39' thereof, a transmission protocol with two individual protocols, which are for example transmitted in a time-shared manner or simultaneously, for example via the HF feed line, in such a way as to connect the HF feed line interface 39' to the two antenna-side terminals 11'b and 111'c with the correct association, allowing the associated base stations BS2 and BS3 to communicate with the antenna devices, or with the mobile communication components 17.2 and 17.3 associated with the antenna devices, with the correct association. After the connection has been established successfully, the transmission protocol may for example be transmitted on the common HF feed line as an HDLC protocol or also for example via two possibly mutually different HDLC protocol signals (for example in the form of an AISG or 3GPP signal).

The multiplex circuits may then simulate variably adjustable current consumptions (current sinks) for each base station, whereby the current-alarmed control in particular of older antenna systems with CWA devices can further be implemented.

With the described construction, galvanic separation of the base-station-side terminals of the multiplex circuits from the antenna-side multiplex circuits is thus provided. Using a corresponding power uptake at the corresponding multiplexer inputs provided for connection to the base station, the base-station-side multiplexers 11L and 111L simulate states (for example power uptake in all operation or fault states) which correspond to those of the ALD devices, such as for example reception amplifiers (with a fixed setting and/or configurable), associated with the respective base station.

The DC power received (interconnected) by the different base stations (optionally with different DC voltages) are transformed by the relevant multiplex circuit to a suitable DC voltage (for example 12 volts or 30 volts or another completely different voltage) and fed into the corresponding feeder cable 5a or 5b and thus into the antenna-side multiplex terminal in order to supply the installed ALD devices and/or components 17.

An additional or the total required DC power uptake of the ALD devices and components and the multiplexers can be made available to the system as required via a further interface on the relevant multiplex device.

For this purpose, reference is made purely by way of example to FIGS. 5a to 5d and FIGS. 6a and 6b, which show schematically a corresponding multiplexer, detached, which comprises, at one terminal location side, for example three interfaces 111a, 111b, 111c or 111'a, 111'b, 111'c in the embodiment of FIGS. 5a to 5d and FIGS. 6a and 6b, via which interfaces the connection to the three base stations BS1, BS2 and BS3 or the three antenna devices can be produced.

Further, FIGS. 5a to 6b illustrate an additional interface 35, which for example is provided as an additional interface and may for example function as an AISG or 3GPP interface or terminal, so as also optionally to provide via this additional interface a DC voltage supply for antenna-side ALD devices and components 17, it also being possible, for example, for the sole purpose of these additional interface to be the provision of an additional power supply.

Via the aforementioned additional interface 35 of the antenna-side multiplexer circuit, further ALD mobile communication components supporting AISG/3GPP or other protocols may also be connected. It is preferably possible to configure the association as to which terminal of the base-station-side multiplexer corresponds to the upper, additional interface 35 of the antenna-side multiplexer. However, if only a single protocol signal is present at a terminal of the base-station-side multiplexer, then the additional interface 35 of the antenna-side multiplexer circuit is associated with precisely this terminal.

Below, reference is further made to the embodiment of FIG. 7, which shows a modified multiplexer according to the invention, i.e. specifically shows a triplexer according to the invention which can in particular be used as an antenna-side triplexer 111H.

Figure 7:
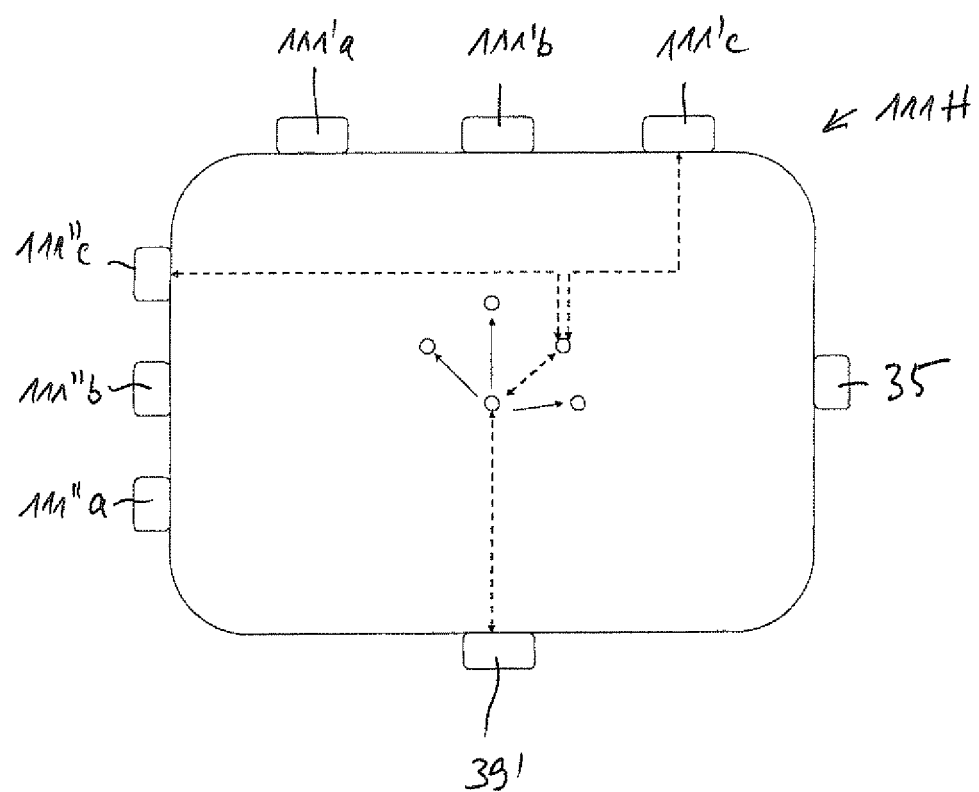
FIG. 7 is an embodiment differing from that of FIGS. 6a and 6b of a multiplexer according to the invention.

From the embodiment, it can be seen that alongside the aforementioned additional interface 35, the antenna-side multiplexer circuit 111H shown in FIG. 7 comprises further terminals, specifically three additional terminals 111"a, 111"b and 111"c in the embodiment shown.

As is shown in the drawings, each transmission protocol received via the HF feed line and the terminal 39' on the feed line side is split as with a splitter and for example supplied not only to the output 111'c but also to the parallel output 111"c. This offers the possibility of being able, via the antenna-side multiplexer circuit 111H, to connect to this additional terminal further ALD mobile communication components which support AISG/3GPP protocols or other protocols and are correspondingly also controlled via the protocol signals. These additional interfaces or terminals have above all the advantage that further ALD components associated individually with each individual antenna system ANT1, ANT2 and/or ANT3 can be integrated into the mobile communication system, for example including RET units provided for adjusting the down-tilt angle or the like. In this way, the arrangement may by contrast with FIG. 7 also be configured in such a way that not only is an additional parallel terminal provided for all three antenna-side terminals 111'a to 111'c, but a single additional terminal 111"a, 111"b or 111"c is provided only for one of these terminals or for any subset thereof, for example only two additional interfaces in the embodiment shown.

Although the additional interfaces are only described for the upper multiplexer 111H by way of FIG. 7, these additional interfaces or some or only one individual further interface may also be provided correspondingly for the base-station-side multiplexer 111L so as to offer additional configuration options.

With the interrogation or scanning means 37 provided in the associated multiplex circuit, the input-side terminals 111 or 111' and optionally also the additional terminal 35 are permanently interrogated so as to establish from which of the terminals for example an HDLC frame, i.e. a corresponding control signal (for example an AISG signal), is coming.

This signal may then be present at the antenna-side terminal 39 and be conveyed onwards.

The mentioned additional interface 35 can thus be used for an additional or total required DC power uptake of all ALD devices and components and for operation of the multiplexer.

The ANT multiplexer terminals facing the antenna side are de-energised and high-resistance at first. The BS multiplex terminals facing the base station are also high-resistance at first. A corresponding DC voltage (for example that of the base station) is present at these.

The antenna-side ANT multiplexer 111H checks each output for any connected DC loads (for example double low-noise reception amplifiers DTMA, provided bias tee circuits SBT or, for example, existing RET circuits for remotely controllable setting of the down-tilt angle), and regularly (the time interval preferably being configurable) measures their current uptake. The DC voltage which is present on an HF feed line (feeder) is only switched through to the ANT multiplexer outputs which are also connected to a DC load. All ANT multiplexer outputs are short-circuit-resistant.

A configuration setting which is given by the system can be preset via further multiplexer interfaces as well as via the ANT multiplexer terminal allocated to the base station. The current uptake measured at the respective antenna-side terminals are communicated to the BS multiplexer. The BS multiplexer then adjusts the power uptakes at the base-station-side terminals thereof in accordance with the communicated measured values. This variable power taken up in this way is constantly used for supplying the connected loads. Thus, the power taken up by the ALD devices and components 17 is passed on transparently to the respective base stations. This transparency is of particular significance in CWA devices, i.e. current-alarmed ALD devices and components.

The multiplexer 111L on the base station side monitors its base-station-side terminals for any protocol signals (for example AISG, 3GPP or other protocols which are different from these) which are present. This monitoring can take place statically or by multiplexing.

If a corresponding signal is identified, the base-station-side multiplexer sends the information thereof to the antenna-side BS multiplexer terminal. The information as to which protocol signal comes from which BS multiplexer input is communicated to the associated ANT multiplexer. This information may optionally be omitted, in particular for example if the various protocols are transmitted simultaneously, for example by frequency division multiplexing. In this case the association as to which protocol signal comes from which BS multiplexer input is determined by the functionality of the multiplexer.

The respective antenna-side multiplexer sends the corresponding protocol signals received via the base-station-side multiplexer terminal to the respective antenna-side ANT multiplexer outputs and thus to the corresponding ALD devices.

The ANT multiplexer outputs via which there is no communication are high-resistance in relation to the protocol signal. Furthermore, there is galvanic separation between the base-station-side terminals of the base-station-side multiplexer circuit 11L or 111L and the antenna-side multiplexer circuit 11H or 111H.

From the described construction, it is clear that the aforementioned additional multiplexer interface 35 can also be omitted if there is sufficient total DC power at the base-station-side terminals. Likewise, via the optional additional interface 35 at the multiplexers, communication with the ALD devices and components 17 which can be reached thereby may also take place, for example in order to adjust and monitor the ALS communication independently of the base stations, for example even in the case of a system installation if the base station has not yet been installed.

The multiplexers can be configured both via the HF terminals (for example via the base-station-side BS multiplexer terminals, but also via the antenna-side BS multiplexer terminal) and via the additional interface 35. These HF terminals, along with the additional interface 35, may also be used as a service interface, in order for example to provide the devices with a new operating program. This also applies to the multiplexers close to the antenna. In addition, the multiplexer close to the antenna may even be configured via a terminal on the base-station-side multiplexer.

The embodiments have been explained for multiplexers which are provided in effect as separate devices or components in the region of the base station before the HF transmission link, or near the associated antenna device at the other end of the HF link which usually runs above the mast or a building.

However, the explained multiplexers can, for example, also be integrated, with their corresponding functions, into an antenna device ANT1 to ANT3 or the associated base station BS1 to BS3.

In addition, the associated multiplexers may for example also support the function of representing different ALD devices in the base-station-side multiplexer, which means for example that the communication interfaces of the individual ALD devices migrate into the relevant multiplexer in the base station. In this way, for example, a multiplexer becomes a standardised ALD device (for example a compound antenna device).

The multiplexers or triplexers 11H or 111H provided close to the antenna may thus be designated in accordance with the described construction as protocol and state or alarm converters, in which for example an AISG or 3GPP protocol or another protocol (for example even a proprietary protocol) is correspondingly converted (for example by frequency modulation or another specified modulation method) or "time-shared" in order to be correspondingly supplied to the transmission line.

The construction of the mobile communication system has been described in the case where each base station is understood to be a mobile communications unit which transmits and/or receives in a particular frequency band. To this extent, the base stations BS1, BS2 and B3 shown in the figures or subsets thereof may also be combined to form a "real base station", a real base station of this type comprising for example BS1 and BS2 (or BS1 and BS3, or BS2 and BS3, or all three base stations B51-B53) as shown in the figures, which may be employed, or transmit and receive, in different frequency bands.

The invention claimed is:

1. Antenna system, in particular mobile communication antenna system, comprising:
at least two base stations,
at least two antenna devices,
at least one radio frequency feed line via which the transmission and/or reception signals are transmitted between the respective base stations and the associated antenna device, the antenna device being able to receive and/or transmit in at least one polarization plane,
at least one antenna component, which is switched between the at least one radio frequency feed line and radiators in the at least one associated antenna device, wherein:
at least one common radio frequency feed line supplying the at least two antenna devices,
a base-station multiplexer circuit being associated with the at least two base stations, the base-station multiplexing circuit having a plurality of base-station radio frequency terminals,
the multiplexer circuit having at least one radio frequency feed line terminal,
the multiplexer circuit having a scanning device configured to scan the base-station terminals, one after another or simultaneously, and supply protocol signals detected at the base-station terminals at the radio frequency feed line terminal, and
the multiplexer circuit being constructed in such a way that the protocol signals present at the at least one radio frequency feed line terminal and/or the transmission protocol present there is converted into different individual protocols for supply to the respectively associated base-station terminals,
the at least two base stations are connected via a respective connection line to a respective input of the base-station multiplexer,
the base-station multiplexer is connected via the radio frequency feed line terminal to the at least one feed line,
at least one further multiplexer circuit is provided and comprises a terminal for connection to the at least one radio frequency feed line,
the antenna multiplexer circuit comprises at least two antenna terminals, one antenna terminal being connected to one antenna device or an antenna component connected upstream from this antenna device and the at least one further terminal being connected to the further antenna device or to an antenna component connected upstream from this further antenna device,
the control of the antenna device or the antenna components upstream from the antenna devices is controlled by protocol via the at least one common radio frequency feed line.

2. Antenna system according to claim 1, wherein the protocols transmitted by the base stations is transferred between the base-station multiplexer circuit and the antenna multiplexer circuit simultaneously, in a time-shifted manner and/or in a time-shared manner, in particular by time division multiplexing, by frequency division multiplexing or by a proprietary modulation method, or by a combination of two or more of the above-mentioned methods.

3. Antenna system according to claim 1, wherein various protocols, in particular at least one antenna interface standards group and/or at least one 3rd generation partnership project protocol and/or at least one proprietary protocol, is converted at the base stations into a different transmission protocol, which is exchanged and/or transmitted between the base-station and antenna multiplexer circuit.

4. Antenna system according to claim 1, wherein the respective protocols exchanged and/or transmitted between the base-station and antenna multiplexer circuit are transmitted to the corresponding antenna components of the antenna device with the correct association.

5. Antenna system according to claim 1, wherein the power uptakes of the antenna components are converted in the antenna multiplexer circuit into a protocol via which, at the base-station associated terminals of the base-station multiplexer circuit, power uptakes corresponding to the actual power uptakes of the antenna components is simulated.

6. Antenna system according to claim 1, wherein a direct current voltage is fed from at least one of the plurality of base stations to the at least one radio frequency feed line via the at least one base-station associated multiplexer circuit.

7. Antenna system according to claim 1, wherein, in the case of different direct current power and/or different direct current voltages provided by plurality of base stations, a common direct current voltage for supplying the antenna components is generated in the multiplexer circuit associated with the base station.

8. Antenna system according to claim 1, wherein at least two feed lines) are provided and are each connected on the base station side to a terminal of a separate multiplexer or to a double multiplexer with two terminals on the radio frequency feed line side, and in that, on the antenna side, two antenna multiplexers or one double multiplexer with two terminals on the radio frequency feed line side is/are provided on the radio frequency feed lines, the at least one antenna device transmitting and/or receiving in two polarization planes and at least one associated base station being set up so as to transmit transmission signals and/or to receive reception signals in two polarization planes.

9. Antenna system according to claim 1, wherein the different current uptakes present at the antenna terminals is represented via the common radio frequency feed line on the respective correctly associated base-station terminal of the base-station multiplexer or simulated or adjusted there, the base station being connected to said multiplexer and communicating with the associated antenna device or the associated mobile communication components from which the current-alarmed or protocol-alarmed state and/or fault signal is received.

10. Antenna system according to claim 1, wherein the multiplexer circuit is structured to supply and/or transmit the protocols or protocol signals detected at the base-station terminals of the multiplexer circuit to the radio frequency feed line terminal simultaneously, in a time-shifted manner and/or in a time-shared manner, by time division multiplexing, by frequency division multiplexing, by another modulation method such as a proprietary modulation method, or by a combination thereof.

11. Antenna system according to claim 1 wherein the scanner device in the multiplexer circuit detects various protocols, including at least one or more antenna interface standards group and/or one or more 3rd generation partnership project protocols, and converts the various protocols into a different transmission protocol, including a High-Level Data Link Control frame network protocol signal, for supply to the radio frequency feed line terminal.

12. Antenna system according to claim 1, wherein the multiplexer circuit is constructed in such a way to supply, of a plurality of different direct current voltages which are present at a plurality of base-station terminals, a single direct current voltage produced from these to the terminal on the radio frequency feed line terminal.

13. Antenna system according to claim 1, wherein at least one base-station terminal of the multiplexer circuit is configured to supply a direct current voltage which is connected to the radio frequency feed line terminal of the multiplexer circuit.

14. Antenna system according to claim 1, wherein the base-station terminals of the multiplexer circuit are high-resistance before the multiplexer operation.

15. Antenna system according to claim 1, wherein the multiplexer is configured to adjust and/or simulate a direct current and/or voltage state change at the at least one radio frequency feed line terminal at the correctly associated base-station terminal or the respectively correctly associated base-station terminals depending on a load connected to the at least one radio frequency feed line terminal.

16. Antenna system according to claim 1, wherein the multiplexer circuit is configured to separate and/or convert, at least one High-Level Data Link Control-frame network protocol signal present at the radio frequency feed line terminal into individual protocol signals and fed in conformance with the terminals to the various base-station terminals or to the antenna terminals.

17. Antenna system according to claim 1, further including, at least one further interface configured to receive a protocol and/or a direct current voltage to configure the multiplexer circuit.

18. Antenna system according to claim 1, further comprising a plurality of further interfaces or terminals respectively being connected in parallel.

* * * * *